(12) United States Patent
Jensen et al.

(10) Patent No.: US 10,828,952 B2
(45) Date of Patent: Nov. 10, 2020

(54) SUSPENSION SYSTEM FOR A WORK VEHICLE

(71) Applicant: CNH Industrial America LLC, New Holland, PA (US)

(72) Inventors: Michael Jensen, Lockport, IL (US); Daniel Payne, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/209,271

(22) Filed: Dec. 4, 2018

(65) Prior Publication Data

US 2020/0171904 A1    Jun. 4, 2020

(51) Int. Cl.
*B60G 9/02* (2006.01)
*B60G 17/015* (2006.01)
*B60G 17/052* (2006.01)

(52) U.S. Cl.
CPC ............ *B60G 9/02* (2013.01); *B60G 17/0152* (2013.01); *B60G 17/052* (2013.01); *B60G 2200/32* (2013.01); *B60G 2202/10* (2013.01); *B60G 2300/082* (2013.01)

(58) Field of Classification Search
CPC .................. B60G 9/02; B60G 2200/32; B60G 2300/082; B60G 3/145; B60G 3/14; B60G 3/02; B60G 2200/24; B60G 2200/20; B60G 9/0258; B60G 2200/326
See application file for complete search history.

(56) References Cited

U.S. PATENT DOCUMENTS

| | | | |
|---|---|---|---|
| 4,422,667 A | 12/1983 | Perry | |
| 4,750,751 A * | 6/1988 | Schafer | A01D 75/285 180/41 |
| 5,312,124 A | 5/1994 | Linde et al. | |
| 5,322,309 A | 6/1994 | Hurlburt | |
| 5,447,321 A * | 9/1995 | Hurlburt | B60G 9/02 180/266 |
| 5,879,016 A * | 3/1999 | Altherr | B60G 9/027 280/124.112 |
| 6,012,724 A * | 1/2000 | Pitkanen | B60G 3/06 180/41 |
| 7,234,562 B2 | 6/2007 | Bordini | |
| 7,510,198 B2 | 3/2009 | Rach et al. | |
| 8,280,590 B2 * | 10/2012 | Mackin | A01D 41/12 701/41 |

(Continued)

FOREIGN PATENT DOCUMENTS

WO    2018/037364    3/2018

OTHER PUBLICATIONS

Extended European Search Report and Opinion dated May 7, 2020 for European Application No. 19213133.2 (6 pages).

*Primary Examiner* — Brian L Swenson
(74) *Attorney, Agent, or Firm* — Rickard K. DeMille; Rebecca L. Henkel

(57) ABSTRACT

A suspension system for a work vehicle includes an axle bar, an inner control member, an outer control member, and a slide housing. The axle bar extends through the inner control member, the outer control member, and the slide housing. The axle bar is non-rotatably coupled to the slide housing and is configured to pivot with the slide housing and relative to the inner control member and the outer control member.

19 Claims, 7 Drawing Sheets

(56) References Cited

U.S. PATENT DOCUMENTS

| | | | |
|---|---|---|---|
| 2006/0090445 A1* | 5/2006 | McLean | A01B 51/026 |
| | | | 56/228 |
| 2008/0202828 A1* | 8/2008 | Kroth | A01C 19/04 |
| | | | 180/6.38 |
| 2011/0001299 A1 | 1/2011 | Wagemann et al. | |
| 2012/0285754 A1* | 11/2012 | Husson | B60G 9/02 |
| | | | 180/60 |
| 2013/0033011 A1* | 2/2013 | Pfiffner | B62D 9/00 |
| | | | 280/5.514 |
| 2013/0270788 A1* | 10/2013 | Wood | B60G 5/04 |
| | | | 280/124.116 |
| 2017/0050693 A1 | 2/2017 | Matties et al. | |
| 2018/0015782 A1 | 1/2018 | Heraudet et al. | |

* cited by examiner

SUSPENSION SYSTEM FOR A WORK VEHICLE

BACKGROUND

The present disclosure relates to a suspension system for a work vehicle.

Generally, a work vehicle includes a driveline and wheels that enable the work vehicle to travel across terrain and to support a weight of the work vehicle. The driveline generally includes an axle shaft connecting the work vehicle to a wheel. In certain work vehicles, a spacing between wheels is adjustable. The axle shaft is connected to an axle housing that is rigidly connected to a frame of the work vehicle. The axle shaft is configured to rotate to transfer motion of a drivetrain to the wheel, thereby enabling the work vehicle to travel across the terrain. The work vehicle may travel across various types of terrain, such as uneven field surfaces, paved roads, and other types of terrain. As the work vehicle travels across such terrain, the rigidly connected axle housing may transfer forces associated with movement of the wheel to other portions of the work vehicle, including a cab. This may reduce traction at the wheel and may reduce occupant comfort in the cab.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a suspension system for a work vehicle includes an axle bar, an inner control member, an outer control member, and a slide housing. The axle bar extends through the inner control member, the outer control member, and the slide housing. The axle bar is non-rotatably coupled to the slide housing and is configured to pivot with the slide housing and relative to the inner control member and the outer control member.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a suspension system for a work vehicle. Certain work vehicles are configured to travel across various types of terrain, including terrain with uneven surfaces. Accordingly, a suspension system is described herein that enables a work vehicle to more efficiently traverse terrain with uneven surfaces. In certain embodiments, the suspension system includes an axle bar, an inner control member, an outer control member, and a slide housing. The axle bar is coupled to the slide housing, and the axle bar and the slide housing are configured to pivot relative to the inner control member and the outer control member within an axle housing. As such, in certain embodiments, the axle bar of the suspension system for the work vehicle is configured to pivot as the work vehicle travels across uneven terrain. As the axle bar pivots, the suspension system may absorb energy associated with the work vehicle traveling across the uneven terrain, thereby increasing traction of tires of the work vehicle and increasing occupant comfort in the work vehicle.

Figure 1:
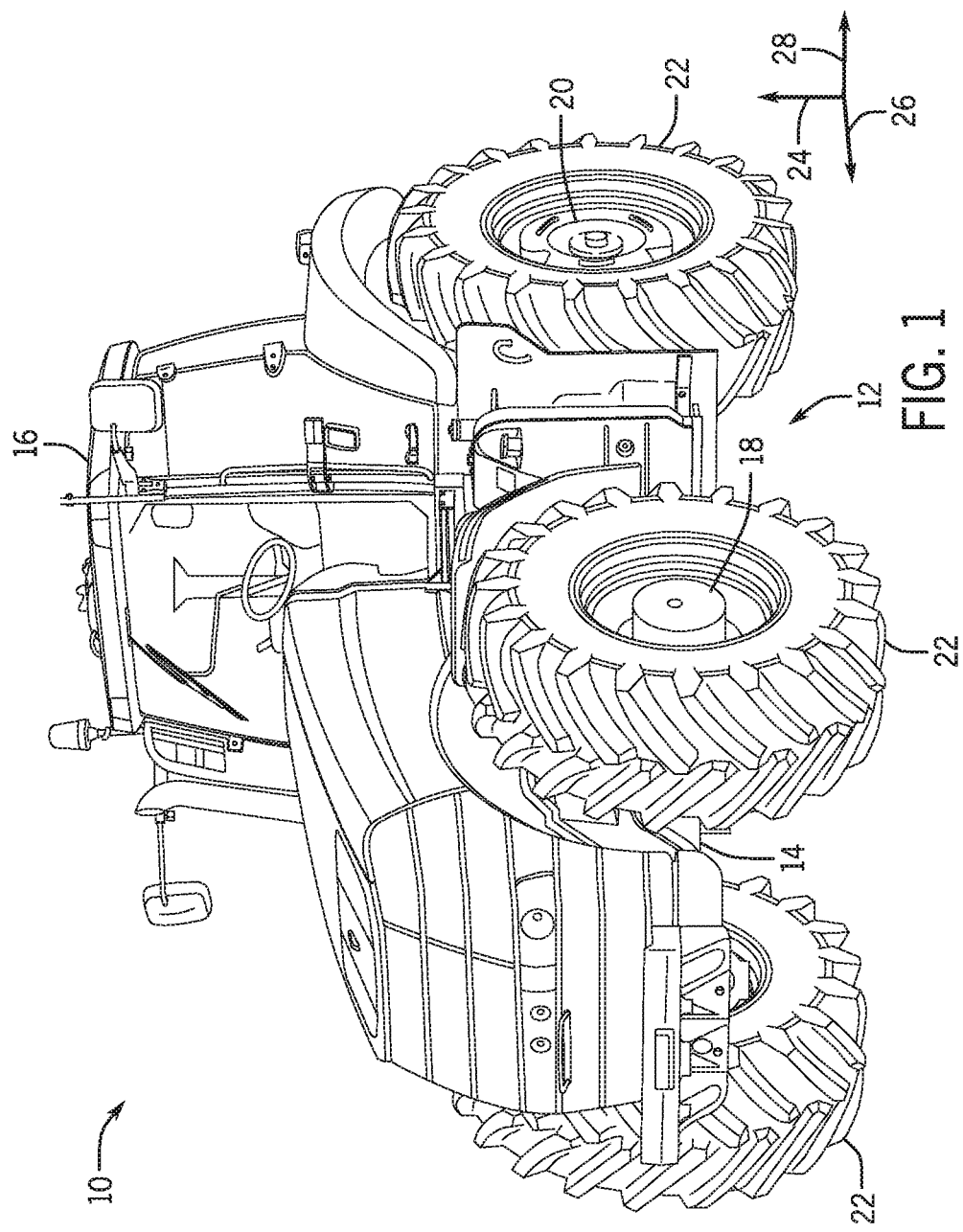
FIG. 1 is a perspective view of an embodiment of a work vehicle having a suspension system.

With the foregoing in mind, the present embodiments relating to suspension systems may be utilized in any suitable work vehicle. For example, FIG. 1 is a perspective view of an embodiment of a work vehicle 10 having a suspension system 12. To facilitate discussion, the work vehicle 10 and certain components of the work vehicle 10 may be described with reference to a vertical axis or direction 24, a longitudinal axis or direction 26, and a lateral axis or direction 28. In the illustrated embodiment, the work vehicle 10 is a tractor that may be coupled to and configured to tow one or more agricultural implements. In certain embodiments, the work vehicle 10 may be an on-road vehicle, a harvester, a sprayer, or another suitable type of vehicle with a suspension system.

In the illustrated embodiment, the work vehicle 10 includes a body 14 configured to house a motor, a transmission, other systems of the work vehicle 10, or a combination thereof. Additionally, the work vehicle 10 includes a cab 16 configured to house an operator. Moreover, the work vehicle 10 includes vehicle wheels, including front wheels 18 and rear wheels 20, at least some of which may be driven by a drive system coupled to the motor and/or the transmission, thereby driving the work vehicle 10 along a field, a road, or any other suitable surface. Each of the front wheels 18 and the rear wheels 20 are coupled to a respective tire 22. The operator may steer the work vehicle 10 by manipulating or providing an input to a hand controller within the cab 16. The hand controller may be a steering wheel. However, the work vehicle 10 may be steered by any suitable controlling device, such as an electronic (e.g., automatic) controlling device located within the work vehicle 10 or remote from the work vehicle 10. Additionally, the operator may slow or stop the work vehicle 10 by manipulating or providing an input to a brake pedal. Furthermore, the work vehicle 10 may be remotely controlled and/or operated autonomously.

As described herein, the suspension system 12 enables the work vehicle 10 to more efficiently traverse a surface. The surface may include various types of terrain. For example, the surface may be an uneven surface and/or may include sand, mud, rocks, grass, hills, valleys, other types of terrain, or a combination thereof. An axle bar of the suspension system 12 coupled to a respective tire 22 may be configured to pivot generally about the longitudinal axis 26 relative to a frame of the work vehicle 10 to enable the work vehicle 10 to more smoothly and efficiently traverse these various types of terrain. As such, the suspension system 12 may increase traction between the surface and the respective tire 22 and may increase occupant comfort in the cab 16.

Figure 2:
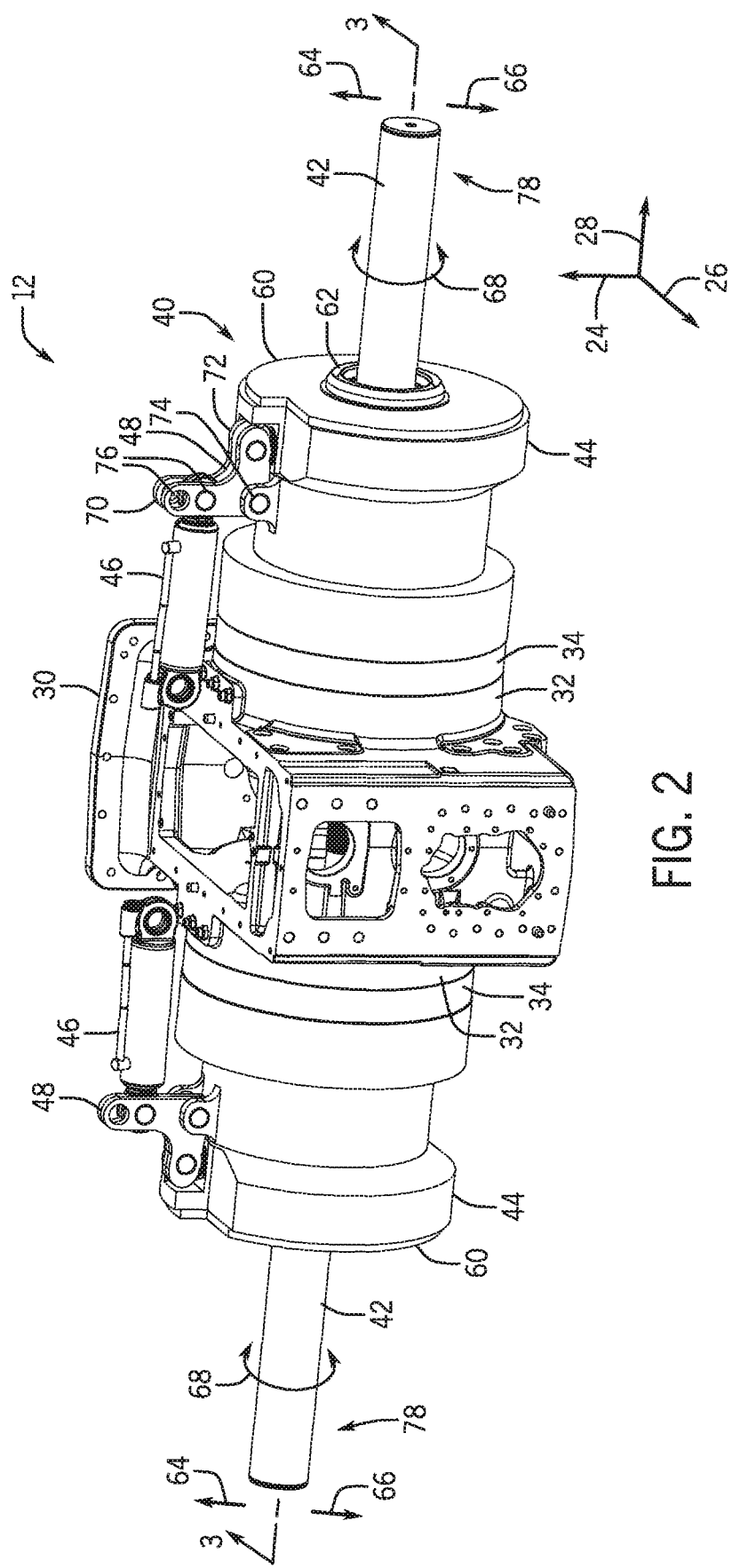
FIG. 2 is a perspective view of an embodiment of a suspension system that may be employed in the work vehicle of FIG. 1.

FIG. 2 is a perspective view of an embodiment of a suspension system 12 that may be employed in the work vehicle of FIG. 1. The suspension system 12 may be employed in a rear portion of the work vehicle and may be coupled to the rear wheels of the work vehicle. In certain embodiments, the suspension system 12 or portions of the suspension system 12 may be employed in a front portion of the work vehicle and may be coupled to the front wheels of the work vehicle. The suspension system 12 may also be coupled to other wheels of the work vehicle.

In the illustrated embodiment, the suspension system 12 includes a differential housing 30, an inner housing member 32, a gear housing 34, and a suspension subassembly 40. The suspension subassembly 40 includes an axle bar 42, an axle housing 44, a suspension cylinder 46, and a bell crank 48. In the illustrated embodiment, the suspension subassembly 40 includes an outer shaft seal plate 60 and an outer shaft seal 62. In certain embodiments, the suspension system 12 and/or the suspension subassembly 40 may include other and/or additional components.

The differential housing 30 houses a differential of the suspension system 12. The differential may include various gears configured to translate a motion of a drive shaft to the axle bar 42. For example, in certain embodiments, the drive shaft may be disposed along and/or parallel to the longitudinal axis 26 and may be coupled to the differential adjacent to or within the differential housing 30. The drive shaft may translate motion and power generated by an engine of the work vehicle to the differential. For example, a first end of the drive shaft may be coupled to the engine (e.g., via a transmission), and a second end of the drive shaft may be coupled to gears of the differential. The engine may rotate the drive shaft which may rotate the gears of the differential.

In certain embodiments, the gears of the differential may be coupled to a gear system. For example, a sun shaft of the gear system may be coupled to the gears of the differential and may be driven to rotate as the gears of the differential rotate. Rotation of the sun shaft may drive rotation of planetary gears of the gear system. Rotation of the planetary gears may drive rotation of a planetary carrier which may rotate the axle bar 42 of the suspension system 12. As such, the power generated by the engine may be transferred to the axle bar 42 via the drive shaft, the differential, and the gear system, thereby driving the axle bar 42 to rotate.

As illustrated, the inner housing member 32 is coupled to the differential housing 30 and the gear housing 34. The inner housing member 32 may house portions of the gear system. For example, the inner housing member 32 may house portions of the sun shaft and/or other portions of the gear system.

As illustrated, the gear housing 34 is coupled to the inner housing member 32 and the axle housing 44. The gear housing 34 houses a portion of the gear system (e.g., a portion of the sun shaft, the planetary gears, the planetary carrier, and a ring gear). In certain embodiments, the gear housing 34 may house all of the gear system or may include portion(s) of the gear system (e.g., the gear housing may be the ring gear of the gear system). Further, one or more seals may be disposed between the differential housing 30 and the inner housing member 32, between the inner housing member 32 and the gear housing 34, between the gear housing 34 and the axle housing 44, or a combination thereof. Additionally, in some embodiments, the differential housing 30, the inner housing member 32, the gear housing 34, the axle housing 44, or a combination thereof, may be a single component.

As illustrated, the axle housing 44 is coupled to the gear housing 34 and the outer shaft seal plate 60. The axle housing 44 houses an inner control member, a slide housing, and an outer control member. In certain embodiments, the axle housing 44 may house other and/or additional components. The suspension subassembly 40 includes the axle housing 44, the inner control member, the slide housing, the outer control member. In certain embodiments, the suspension subassembly 40 may include other and/or additional components.

As illustrated, the outer shaft seal plate 60 is coupled to the axle housing 44 and the outer shaft seal 62. The outer shaft seal plate 60 provides an interface for the outer shaft seal 62 to couple to other components of the suspension system 12 (e.g., to the axle bar 42). In certain embodiments, the outer shaft seal plate 60 may be omitted such that the outer shaft seal 62 couples directly to the axle housing 44 or to the outer control member. The axle bar 42 protrudes through the outer shaft seal plate 60 and the outer shaft seal 62. As the axle bar 42 pivots and rotates, the outer shaft seal 62 substantially maintains a seal at an interface of the axle bar 42 and the outer shaft seal plate 60.

As illustrated, the bell crank 48 is coupled to the axle housing 44 at a pivot point 74 of the bell crank 48, to the suspension cylinder 46 at a first end 70 of the bell crank 48, and to a connecting rod at a second end 72 of the bell crank 48. The connecting rod may be coupled to the slide housing at a first end of the connecting rod and to the bell crank 48 at a second end of the connecting rod. In certain embodiments, the bell crank 48 rotates about the pivot point 74. For example, as the axle bar 42 pivots, the slide housing moves and pivots within the axle housing 44. As the slide housing moves and pivots, the connecting rod moves generally along the vertical axis 24. The movement of the connecting rod causes the bell crank 48 to rotate about the pivot point 74.

As illustrated, the first end 70 of the bell crank 48 includes multiple connection points 76 each configured to connect the bell crank 48 to the suspension cylinder 46. Each connection point 76 may enable the suspension subassembly 40 provide a target damping/firmness for a corresponding wheel position. The wheel position is a position of the wheel along the axle bar 42. For example, if a wheel position is changed on the work vehicle, the suspension cylinder 46 may be adjusted to connect to a different connection point 76. The different locations of the connection points 76 facilitate control of the force applied by the suspension cylinder 46. As such, the different locations of the connection points 76 and the ability to adjust the location where the suspension cylinder 46 is coupled to the bell crank 48 enables the suspension subassembly 40 to provide different levels of suspension damping/firmness.

The suspension cylinder 46 is coupled to the bell crank 48 at a first end of the suspension cylinder 46 and to a portion of the work vehicle frame at a second end of the suspension cylinder 46. In certain embodiments, the second end of the suspension cylinder 46 may be coupled to the differential housing 30, which is coupled to the work vehicle frame. As the bell crank 48 rotates about the pivot point 74, the suspension cylinder 46 compresses or extends depending on the movement of the bell crank 48 and the axle bar 42. As illustrated, the suspension cylinder 46 is a hydraulic cylinder configured to selectively compress and extend. In certain embodiments, the suspension cylinder 46 may be a pneumatic cylinder, a spring, or another suspension component configured to absorb energy associated with the axle bar 42 pivoting.

As illustrated, the axle bar 42 is configured to generally pivot along an upward direction 64 and a downward direction 66 and generally rotate along a rotational direction 68. Each of the upward direction 64 and the downward direction 66 are generally along the vertical axis 24, and the rotational direction 68 is generally about the lateral axis 28. As a wheel end 78 of the axle bar 42 pivots generally downwardly in the downward direction 66 (e.g., away from the suspension cylinder 46), the slide housing and the connecting rod also move generally downwardly in the downward direction 66. The second end 72 of the bell crank 48 is pulled downwardly by the connecting rod. As such, the bell crank 48 rotates about the pivot point 74, such that the first end 70 moves away from the suspension cylinder 46. The rotation of the bell crank 48 causes the suspension cylinder 46 to extend. The extension of the suspension cylinder 46 dissipates a portion of the energy associated with the axle bar 42 pivoting generally downwardly in the downward direction 66.

In another example, as the wheel end 78 of the axle bar 42 pivots about the longitudinal axis 26 and generally upwardly in the upward direction 64 (e.g., toward the suspension cylinder 46), the slide housing and the connecting rod also move generally upwardly in the upward direction 64. The second end 72 of the bell crank 48 is pushed upwardly by the connecting rod. As such, the bell crank 48 rotates about the pivot point 74, such that the first end 70 moves toward the suspension cylinder 46. The rotation of the bell crank 48 causes the suspension cylinder 46 to compress. The compression of the suspension cylinder 46 dissipates a portion of the energy associated with the axle bar 42 pivoting generally upwardly in the upward direction 64.

As illustrated, the suspension cylinder 46 extends generally along the lateral axis 28. However, in certain embodiments, the suspension cylinder 46 may extend generally along the vertical axis 24 or in an orientation generally between the vertical axis 24 and the lateral axis 28, and may be configured to absorb energy associated with the pivoting of the axle bar 42.

Figure 3:
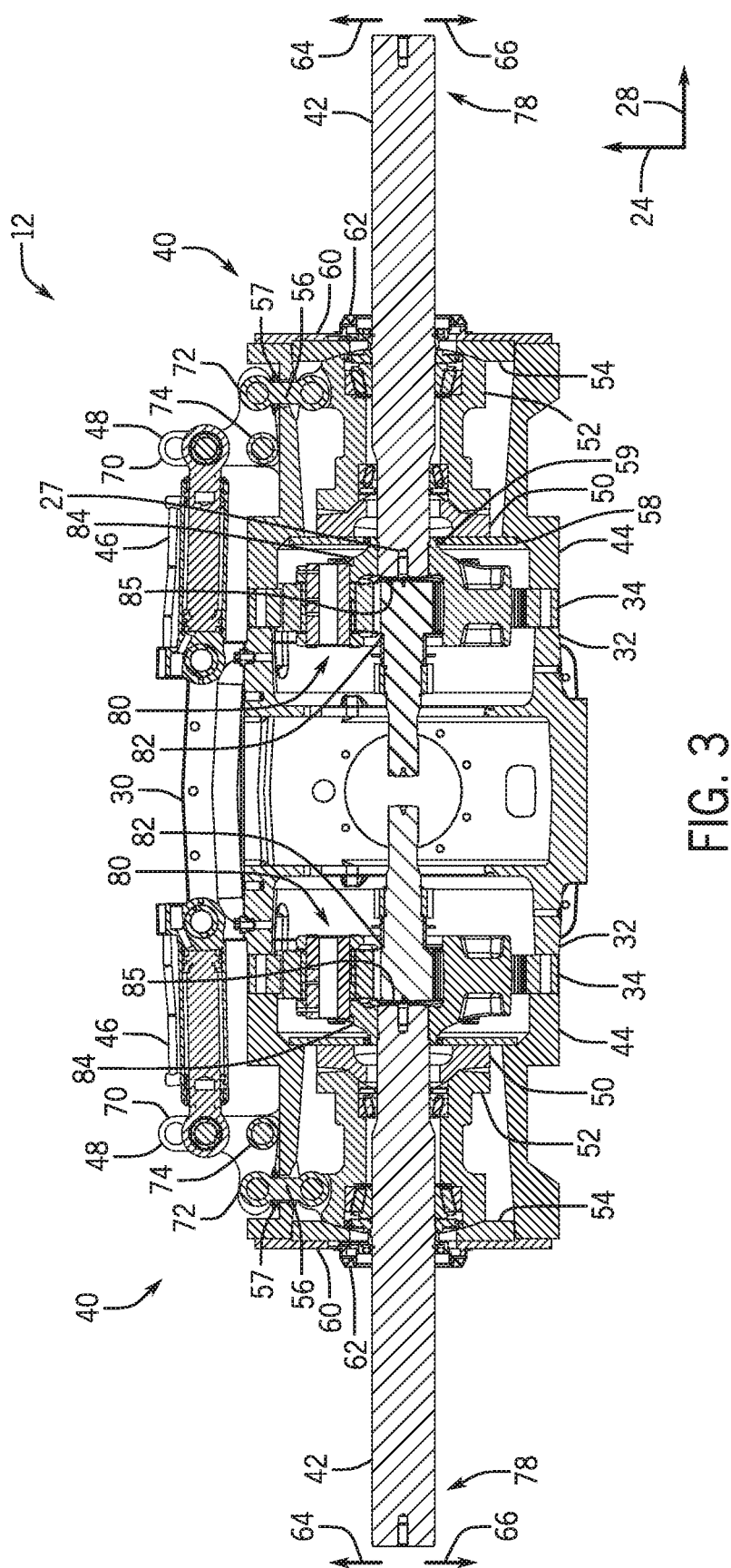
FIG. 3 is a cross-sectional view of the suspension system of FIG. 2, taken along line 3-3 of FIG. 2.

FIG. 3 is a cross-sectional view of an embodiment of the suspension system 12 of FIG. 2, taken along line 3-3 of FIG. 2. As illustrated, the suspension system 12 includes the differential housing 30, the inner housing member 32, the gear housing 34, the gear system 80, and the suspension subassembly 40. In the illustrated embodiment, each of the inner housing member 32, the gear housing 34, the gear system 80, and the suspension subassembly 40 are disposed on a first side and a second side of the differential housing 30. The inner housing member 32 houses a portion of the gear system 80, including sun gear 82 and planetary carrier 84. As illustrated, the planetary carrier 84 is coupled to the sun gear 82 and to the axle bar 42. The gear housing 34 houses a portion of the gear system 80. In certain embodiments, the inner housing member 32, the gear housing 34, the axle housing 44, or a combination thereof, may form a single housing configured to house components and systems of the suspensions system 12. A differential disposed generally in the differential housing 30 may be configured to rotate the sun gear 82 of the gear system 80 on each side of the suspension system 12. The sun gear 82 may drive rotation of the planetary gears and the planetary carrier 84 of the gear system 80. The planetary carrier 84 may drive rotation of the axle bar 42.

The suspension subassembly 40 includes the axle bar 42, an inner shaft seal plate 58, an inner shaft seal 59, an inner control member 50, a slide housing 52, an outer controller member 54, a connecting rod 56, a connecting rod seal 57, the suspension cylinder 46, the bell crank 48, the outer shaft seal plate 60, and the outer shaft seal 62. In certain embodiments, the suspension subassembly 40 may also include the differential housing 30, the inner housing member 32, the gear housing 34, the gear system 80, or a combination thereof.

As illustrated, the inner control member 50 and the inner shaft seal plate 58 are individual components. Embodiments with the inner control member 50 and the inner shaft seal plate 58 as individual components may facilitate replacing the inner control member 50, the inner shaft seal plate 58, the inner shaft seal 59, other components of the suspension subassembly 40, or a combination thereof. Additionally, shims may be disposed between the inner control member 50 and the inner shaft seal plate 58 to enable an appropriate fit of the components of the suspension subassembly 40. However, in certain embodiments, the inner control member 50 and the inner shaft seal plate 58 may be a single component coupled to the inner shaft seal 59, the slide housing 52, the axle housing, or a combination thereof.

As illustrated, the suspension subassembly 40 also includes an axle bar cap 85 at the end of each axle bar 42 adjacent to the planetary carrier 84. The axle bar cap 85 is configured to form a seal within the planetary carrier 84 inward from the end of the axle bar 42 along the lateral axis 28 as the axle bar 42 pivots and/or rotates. Additionally, the inner shaft seal 59 is coupled to an interior portion of the inner shaft seal plate 58 and is configured to form a seal at the planetary carrier 84. For example, the axle bar 42 protrudes through the inner shaft seal plate 58 and into the planetary carrier 84. The inner shaft seal 59 is configured to substantially maintain a seal at an interface of the planetary carrier 84 and the inner shaft seal plate 58 as the planetary carrier 84 rotates. As such, the axle bar cap 85 and the inner shaft seal 59, in combination, provide a seal and/or fluid barrier between the gear system 80 and the suspension subassembly 40. As illustrated, the inner shaft seal plate 58 is rigidly coupled to the axle housing 44 and to the inner control member 50. The slide housing 52 is pivotally coupled to the inner control member 50 and to the outer control member 54. As such, the slide housing 52 is configured to pivot with the axle bar 42 and relative to the axle housing 44, the inner shaft seal plate 58, the inner control member 50, and the outer control member 54.

The axle bar 42 is configured to pivot about a pivot point 27, such that the wheel end 78 moves generally vertically in the upward direction 64 and in the downward direction 66. Additionally, the axle bar 42 is non-rotatably coupled to the gear system 80 and pivotally coupled to the gear system 80. For example, a crowned spline connection may provide the pivotable joint that is a non-rotatably coupling. For example, the axle bar 42 is configured to pivot about the pivot point 27 as the gear system 80 drives the axle bar 42 in the rotational direction. As the axle bar 42 pivots about the pivot point 27, one or more portions of the suspension subassembly 40 may pivot with the axle bar 42. For example, the slide housing 52 is configured to pivot about the pivot point 27 with the axle bar 42.

The connecting rod 56 is coupled at a first end to the slide housing 52. A second end of the connecting rod 56 is coupled to the second end 72 of the bell crank 48. The connecting rod 56 extends through a hole of the axle housing 44. The connecting rod seal 57 is coupled to the axle housing 44 and is configured to substantially maintain a seal between the connecting rod 56 and the axle housing 44 at the opening in the axle housing 44 as the connecting rod 56 moves relative the axle housing 44. As the slide housing 52 pivots about the pivot point 27, the connecting rod 56 transfers motion of the slide housing 52 to the bell crank 48. The transfer of motion from the connecting rod 56 causes the bell crank 48 to rotate about the pivot point 74. As such, the bell crank 48 rotates about the pivot point 74 as the slide housing 52 and the axle bar 42 pivot. The bell crank 48 is coupled to the suspension cylinder 46 at the first end 70 of the bell crank 48 and to the connecting rod 56 at the second end 72 of the bell crank 48. As the bell crank 48 rotates about the pivot point 74, the suspension cylinder 46 is selectively driven to extend and compress. A first end of the suspension cylinder 46 is coupled to the first end 70 of the bell crank 48, and a second end of the suspension cylinder 46 is coupled to the frame of the work vehicle. As such, as the axle bar 42 and the slide housing 52 pivot, the bell crank 48 is driven to rotate, thereby driving the suspension cylinder 46 to extend and compress. In this manner, the suspension cylinder 46 may absorb energy associated with the axle bar 42 pivoting.

Figure 4:
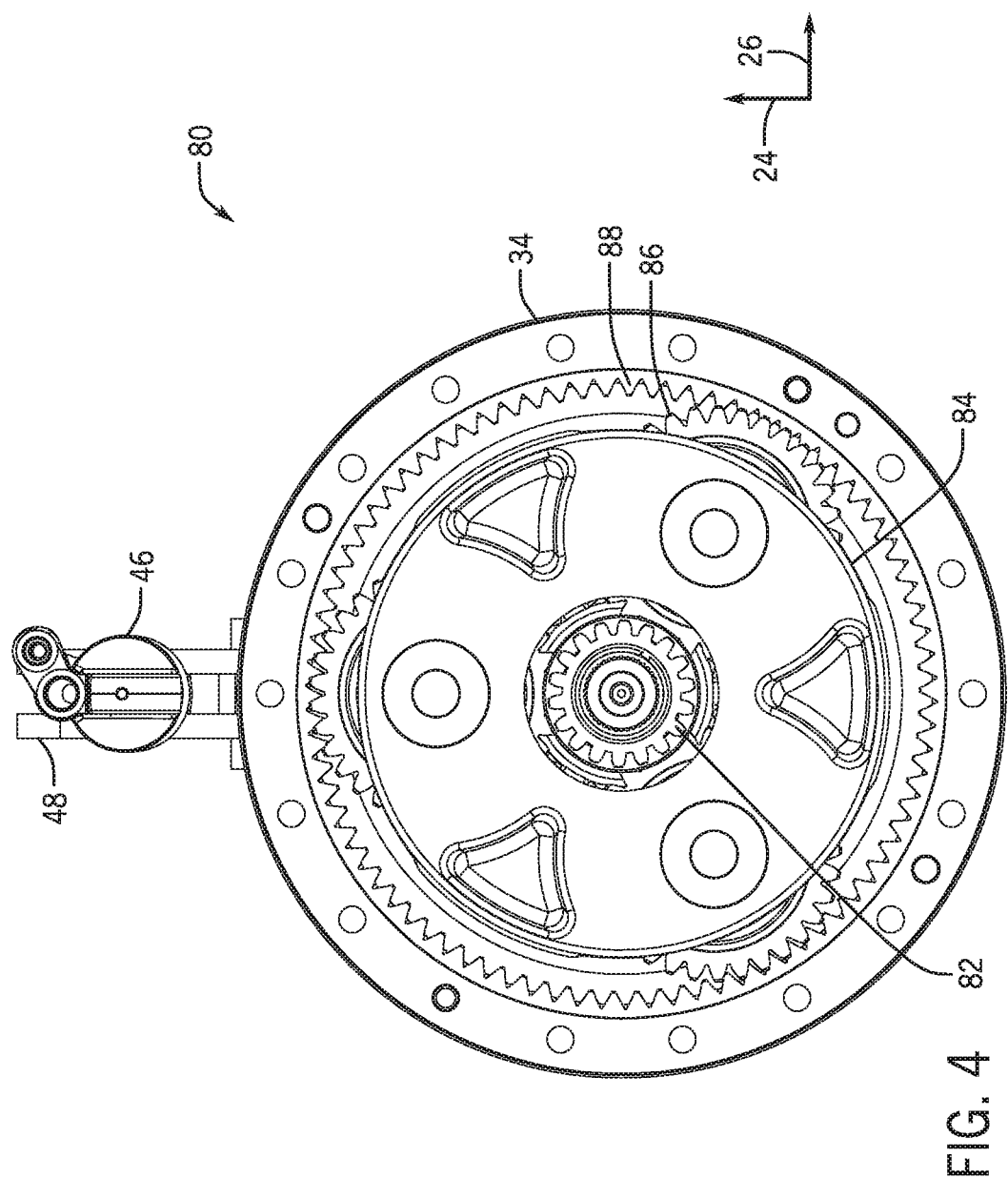
FIG. 4 is a side view of a gear system of the suspension system of FIG. 2.

FIG. 4 is a side view of the gear system 80 of the suspension system of FIG. 2. The gear system 80 includes a sun gear 82, a planetary carrier 84, planet gears 86, and a ring gear 88. As illustrated, each of the sun gear 82, the planetary carrier 84, the planet gears 86, and the ring gear 88 includes teeth configured to mate to another gear. The sun gear 82 is non-rotatably coupled to the differential of the suspension system, and the teeth of the sun gear 82 engaged corresponding teeth of the planet gears 86. The planetary carrier 84 is coupled to each planet gear 86 and is configured to rotate as the planet gears 86 rotate. The teeth of the planet gears 86 engage corresponding teeth of the ring gear 88. The ring gear 88 is coupled to the gear housing 34. The sun gear 82 is driven to rotate by the differential of the suspension system. The rotation of the sun gear 82 drives rotation of the planet gears 86 around an interior of the ring gear 88. The rotation of the planet gears 86 drives the planetary carrier 84 to rotate in the same direction of rotation as the sun gear 82 and at a different rotational speed compared to the sun gear 82.

The planetary carrier 84 is coupled to a first side of the axle bar and is configured to drive the axle bar to rotate. As such, the gear system 80 may translate rotational motion from the differential to the axle bar, thereby enabling the axle to drive the corresponding wheel to rotate. In certain embodiments, the planetary carrier 84 and the driven end of the axle bar are splined to non-rotatably couple the axle bar to the planetary carrier 84. The splines of the driven end of the axle bar may be crowned to enable the axle bar to pivot while non-rotatably coupled to the planetary carrier 84. For example, the axle bar may be configured to pivot about a pivot point at the driven end of the axle bar while non-rotatably coupled to the planetary carrier 84.

Figure 5:
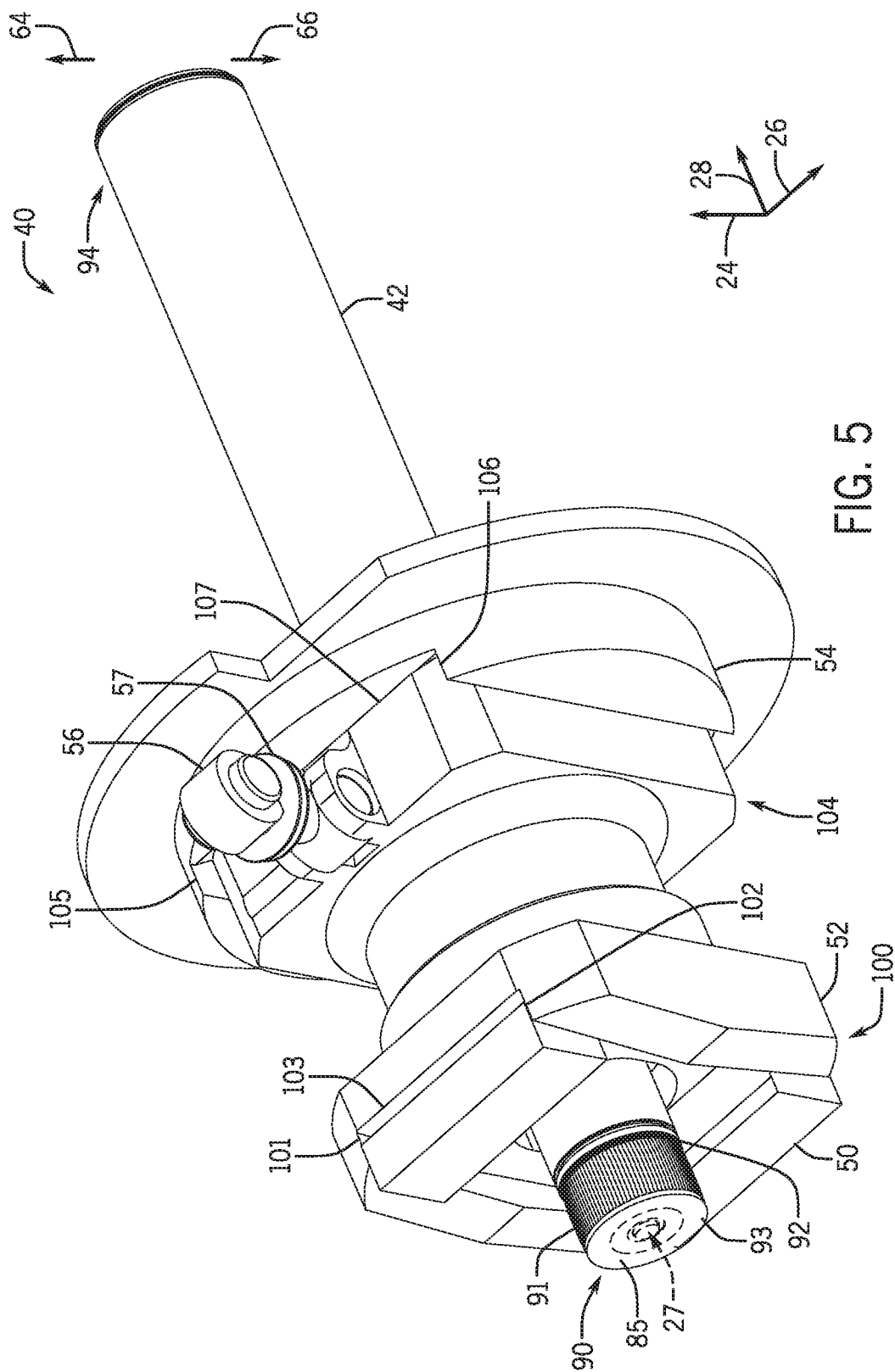
FIG. 5 is a perspective view of a suspension subassembly of the suspension system of FIG. 2.

FIG. 5 is a perspective view of the suspension subassembly 40 of the suspension system of FIG. 2. The suspension subassembly 40 includes the axle bar 42, the inner control member 50, the slide housing 52, and the outer control member 54. In certain embodiments, the suspension subassembly 40 may include additional components of the suspension system described herein.

As illustrated, the axle bar 42 includes a first end 90 (e.g., the driven end) coupled to the axle bar cap 85 and a second end 94 (e.g., the wheel end). The first end 90 extends from a first portion 92 of the axle bar 42 to a second portion 93 of the axle bar 42. The first end 90 includes splines 91 and is configured to couple to the gear system. The splines 91 may interface with corresponding splines of the planetary carrier of the gear system to enable the gear system to drive the axle bar 42 to rotate. In the illustrated embodiment, the first end 90 is crowned such that a first diameter of the axle bar 42 at the splines 91 is larger than a second diameter of the axle bar 42 at the first portion 92 and at the second portion 93. The crown of the first end 90 may enable the axle bar 42 to pivot about a pivot point 27 while being non-rotatably coupled to the gear system. Accordingly, the axle bar 42 may rotate while pivoting about the pivot point 27. The second end 94 of the axle bar 42 may be coupled to the wheel.

As illustrated, a first end 100 of the slide housing 52 has a first sidewall 101, a second sidewall 102, and a third sidewall 103. The first sidewall 101 and the second sidewall 102 extend along the vertical axis 24 and are disposed generally opposite each other along the longitudinal axis 26 at the first end 100. The third sidewall 103 extends along the longitudinal axis 26 and is generally disposed between the first sidewall 101 and the second sidewall 102. The inner control member 50 is disposed between the first sidewall 101 and the second sidewall 102 and is in contact with the slide housing 52 at the first sidewall 101 and the second sidewall 102. The slide housing 52 is configured pivot as the axle bar 42 pivots about the pivot point 27. As the slide housing 52 pivots, the inner control member 50 remains in contact with the first sidewall 101 and the second sidewall 102. For example, a lubricant may be disposed between the inner control member 50 and the first sidewall 101 and/or between the inner control member 50 and the second sidewall 102 to facilitate movement of the slide housing 52 along the inner control member 50. Additionally, the contact between the inner control member 50 and the first sidewall 101 and between the inner control member 50 and the second sidewall 102 blocks movement the slide housing 52 relative to the inner control member 50 along the longitudinal axis 26 and blocks rotation of the slide housing 52 as the axle bar 42 rotates. Further, the third sidewall 103 is a stop surface configured to stop the pivoting of the slide housing 52 at a top and a bottom of the slide housing 52 and at a corresponding top and a corresponding bottom of the inner control member 50.

A second end 104 of the slide housing 52 is disposed generally opposite the first end 100 of the slide housing 52 along the lateral axis 28. The second end 104 is configured to contact and move along the outer control member 54. The outer control member 54 has a first sidewall 105, a second sidewall 106, and a third sidewall 107. The first sidewall 105 and the second sidewall 106 extend along the vertical axis 24 and are disposed opposite each other along the longitudinal axis 26. The third sidewall 107 extends along the longitudinal axis 26 and is disposed between the first sidewall 105 and the second sidewall 106. The second end 104 of the slide housing 52 is disposed between the first sidewall 105 and the second sidewall 106 and is in contact with the outer control member 54 at the first sidewall 105 and the second sidewall 106. The slide housing 52 is configured to pivot as the axle bar 42 pivots about the pivot point 27. As the slide housing 52 pivots, the slide housing 52 remains in contact with the first sidewall 105 and the second sidewall 106. For example, a lubricant may be disposed between the second end 104 of the slide housing 52 and the first sidewall 105 and/or between the second end 104 of the slide housing 52 and the second sidewall 106 to facilitate movement of the slide housing 52 along the outer control member 54.

As such, the axle bar 42 and the slide housing 52 are configured to pivot about the pivot point 27 relative to the inner control member 50 and the outer control member 54. The inner control member 50 and the outer control member 54 may guide the slide housing 52 as the axle bar 42 and the slide housing 52 pivot about the pivot point 27. For example, the first sidewall 101 and the second sidewall 102 of the first end 100 of the slide housing 52 may block motion of the slide housing 52 along the longitudinal axis 26 as the slide housing 52 pivots about the pivot point 27. The first sidewall 105 and the second sidewall 106 of the outer control member 54 may block motion of the slide housing 52 along the longitudinal axis 26 as the slide housing 52 pivots about the pivot point 27. Additionally, the sidewalls 101, 102, 105, and 106 prevent rotation of the slide housing 52 about the lateral axis 28 and restrict the slide housing 52 to the pivoting motion generally about the longitudinal axis 26.

Figure 6:
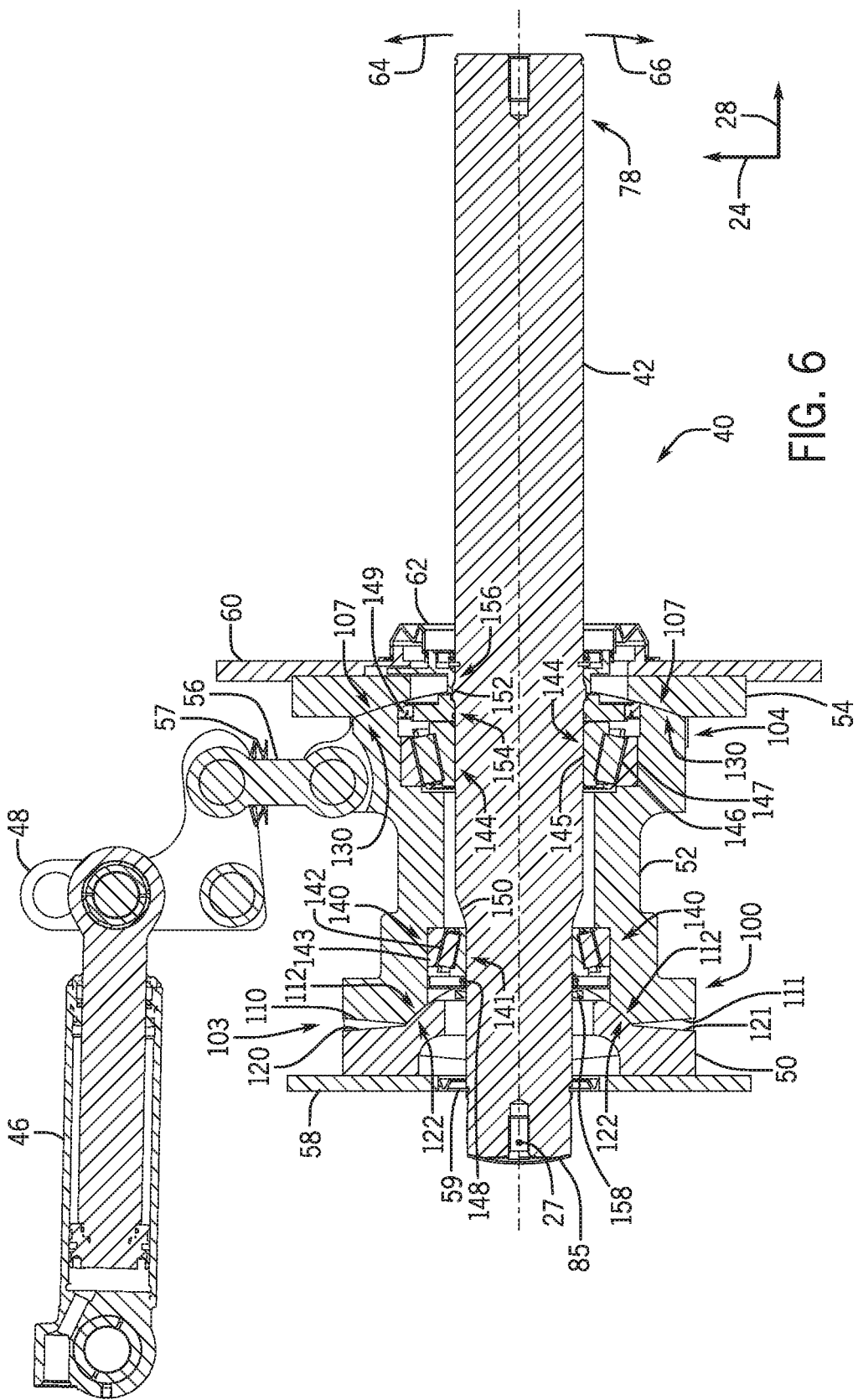
FIG. 6 is a cross-sectional view of a first position of the suspension subassembly of FIG. 5.

FIG. 6 is a cross-sectional view of the suspension subassembly 40, in which the axle is in the first position. As illustrated, the axle bar 42 extends through the inner shaft seal plate 58, the inner control member 50, the slide housing 52, the outer control member 54, the outer shaft seal plate 60, and the outer shaft seal 62. The axle bar 42 is configured to pivot about the pivot point 27 and to rotate. As the axle bar 42 pivots and rotates, the inner shaft seal 59, the outer shaft seal 62, and the axle bar cap 85 are configured to substantially maintain a seal at the axle bar 42. As the axle bar 42 pivots about the pivot point 27, the slide housing 52 also pivots about the pivot point 27. The movement of the slide housing 52 causes the connecting rod 56 to drive the bell crank 48 to rotate. Rotation of the bell crank 48 drives the suspension cylinder 46 to selectively extend and compress.

In the illustrated embodiment, bearings are disposed within the slide housing 52 to enable the axle bar 42 to rotate relative to the slide housing 52. For example, as illustrated, a first bearing assembly 140 and a second bearing assembly 144 are disposed within the slide housing 52. The first bearing assembly 140 includes an inner ring 141, bearings 142, and an outer ring 143. The second bearing assembly 144 includes an inner ring 145, bearings 146, and an outer ring 147. The inner ring 141 and the inner ring 145 are disposed on the axle bar 42 and configured to rotate with the axle bar 42. As the inner ring 141 and the inner ring 145 rotate, the bearings 142 and the bearings 146 rotate around the outer ring 143 and the outer ring 147, respectively. The outer ring 143 and the outer ring 147 are non-rotatably coupled to the slide housing 52 and remain stationary relative to the rotation of the axle bar 42. In certain embodiments, a lubricant may be disposed within each of the first bearing assembly 140 and the second bearing assembly 144 to facilitate rotation of the axle bar 42. As such, as the axle bar 42 rotates, the inner ring 141, the bearings 142, the inner ring 145, and the bearings 146 may rotate within the slide housing 52, thereby establishing a rotatable coupling between the slide housing 52 and the axle bar 42.

The inner control member 50, the slide housing 52, and the outer control member 54 include surfaces that enable the slide housing 52 to pivot relative to the inner control member 50 and the outer control member 54. As illustrated, the inner control member 50 includes a first surface 120, a second surface 121, and a third surface 122. The first surface 120 and the second surface 121 are generally flat, and the third surface 122 is concentric about the pivoting axis of the axle bar 42. The third sidewall 103 of the first end 100 of the slide housing 52 includes a first surface 110, a second surface 111, and a third surface 112. The first surface 110 and the second surface 111 are generally flat, and the third surface 112 is concentric about the pivoting axis of the axle bar 42. As the axle bar 42 and the slide housing 52 pivot about the pivot point 27, the third surface 112 of the slide housing 52 moves along the third surface 122 of the inner control member 50. The concentric shapes of the third surface 112 of the slide housing 52 and the third surface 122 of the inner control member 50 enable the slide housing 52 to pivot relative to the inner control member 50 and about the pivot point 27. Further, contact between the third surface 112 of the slide housing 52 and the third surface 122 of the inner control member 50 blocks inward movement of the slide housing 52 along the lateral axis 28 and controls the pivoting of the axle bar 42 along the upward direction 64 and the downward direction 66.

The first surface 110 of the third sidewall 103 is disposed at a first end of the sidewall 103. The first surface 110 is configured to contact the first surface 120 of the inner control member 50 as the wheel end 78 of the axle moves generally upwardly along the vertical axis 24 and in the upward direction 64. As such, the first surface 110 of the third sidewall 103 and the first surface 120 of the inner control member 50 block the pivoting movement of the axle bar 42 and the slide housing 52 when the first surface 110 of the third sidewall 103 contacts the first surface 120 of the inner control member 50.

The second surface 111 of the third sidewall 103 is disposed at a second end of the sidewall 103. The second surface 111 is configured to contact the second surface 121 of the inner control member 50 as the wheel end 78 of the axle moves generally downwardly along the vertical axis 24 and in the downward direction 66. As such, the second surface 111 of the third sidewall 103 and the second surface 121 of the inner control member 50 block the pivoting movement of the axle bar 42 and the slide housing 52 when the second surface 111 of the third sidewall 103 contacts the second surface 121 of the inner control member 50.

The third sidewall 107 of the outer control member 54 is configured to contact a sidewall 130 of the second end 104 of the slide housing 52. The sidewall 130 is configured to move along the third sidewall 107. For example, as the slide housing 52 pivots about the pivot point 27, the sidewall 130 may move along the third sidewall 107. A lubricant may be disposed between the third sidewall 107 and the sidewall 130 to facilitate movement of the sidewall 130 along the third sidewall 107.

As illustrated, the suspension subassembly 40 includes an inner bearing seal 148 and an outer bearing seal 149. The inner bearing seal 148 forms and substantially maintains a seal between the first bearing assembly 140 and portions of the slide housing 52 and/or other portions of the suspension subassembly 40 (e.g., the inner control member 50, the inner shaft seal 59, etc.). The outer bearing seal 149 forms and substantially maintains a seal between the second bearing assembly 144 and portions of the slide housing 52 and/or other portions of the suspension subassembly 40 (e.g., the outer control member 54, the outer shaft seal 62, etc.). As such, the inner bearing seal 148 and the outer bearing seal 149 enable the first bearing assembly 140 and the second bearing assembly 144 to be lubricated with oil and/or with other lubricants. For example, the area adjacent to the first bearing assembly 140 and the second bearing assembly 144 may be lubricated with a first lubricant (e.g., oil), and the area adjacent to the surfaces of the inner control member 50, the slide housing 52, and the outer control member 54 contacting one another (e.g., the third surface 112, the third surface 122, the third sidewall 107, the sidewall 130, etc.) may be lubricated with a second lubricant (e.g., grease). The inner bearing seal 148 and the outer bearing seal 149 may form and substantially maintain the seal such that the first and second lubricants do not mix.

As illustrated, the axle bar 42 includes an inner chamfer 150 and an outer chamfer 152. As the inner chamfer 150 extends along the axle bar 42 toward the wheel end 78, the inner chamfer 150 increases in width such that a slope is created along the axle bar 42. The inner chamfer 150 at least partially prevents a stress riser along the axle bar 42. As illustrated, the outer chamfer 152 is an extension protruding radially from the axle bar 42. The protrusion of the outer chamfer 152 is configured to extend into a slot created by a first end component 154 and a second end component 156. As such, the outer chamfer 152 is configured to block movement of the axle bar 42 inwardly and/or outwardly along the lateral axis 28.

As illustrated, the suspension subassembly 40 also includes a ring 158 (e.g., a snap ring and shims) that is disposed around the axle bar 42 adjacent to the first bearing assembly 140 such that the axle bar 42 protrudes through the ring 158. The ring 158 blocks movement of the first bearing assembly 140 inwardly along the lateral axis 28 and toward the differential. For example, the inner ring 141 may contact the ring 158 to block the inward movement of the axle bar 42.

Figure 7:
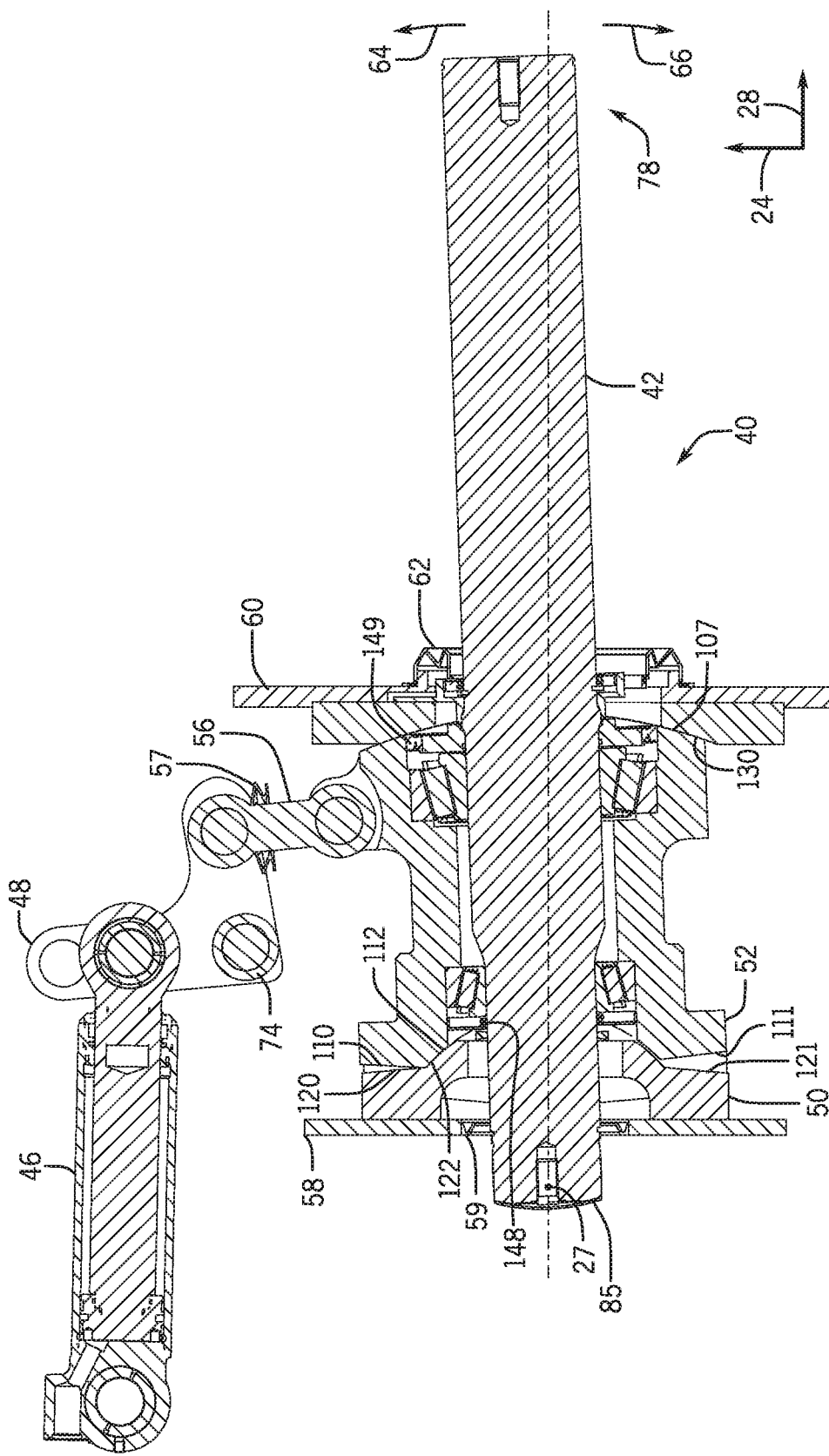
FIG. 7 is a cross-sectional view of a second position of the suspension subassembly of FIG. 5.

FIG. 7 is a cross-sectional view of the suspension subassembly 40 of FIG. 5, in which the axle bar 42 is in the second position. As illustrated, the axle bar 42 and the slide housing 52 are pivoted about the pivot point 27 relative to the inner control member 50 and the outer control member 54, such that the wheel end 78 of the axle bar 42 is positioned upwardly relative to the first position shown in FIG. 6. The first surface 110 of the slide housing 52 is in contact with the first surface 120 of the inner control member 50, thereby blocking the slide housing 52 from further pivoting upwardly. The third surface 112 of the slide housing 52 has moved upward along the third surface 122 of the inner control member 50. The sidewall 130 of the slide housing 52 has moved upwardly along the third sidewall 107 of the outer control member 54.

The illustrated pivoting movement of the slide housing 52 drives the connecting rod 56 generally upwardly along the vertical axis 24. As illustrated, the upward movement of the connecting rod 56 drives the bell crank 48 to rotate about the pivot point 74, thereby moving the first end 70 toward the suspension cylinder 46. The rotation of the bell crank 48 drives the suspension cylinder 46 to compress. As illustrated, the suspension cylinder 46 is in a compressed state. As such, the suspension cylinder 46 may compress as wheel end 78 of the axle bar 42 moves upwardly along the vertical axis 24 and in the upward direction 64.

In certain embodiments, the axle bar 42 and the slide housing 52 may pivot such that the wheel end 78 of the axle bar 42 moves downwardly along the vertical axis 24. As the slide housing 52 is pivoted generally downward about the pivot point 27, the second surface 111 of the slide housing 52 may contact the second surface 121 of the inner control member 50, thereby blocking the slide housing 52 from further pivoting downwardly. Additionally, as the slide housing 52 is pivoted generally downwardly about the pivot point 27, the third surface 112 of the slide housing 52 may move downwardly along the third surface 122 of the inner control member 50, and the sidewall 130 of the slide housing 52 may move downwardly along the third sidewall 107 of the outer control member 54.

As the axle bar 42 and the slide housing 52 pivot generally downwardly away from the suspension cylinder 46, the connecting rod 56 may be driven downwardly. The downward movement of the connecting rod 56 may drive the bell crank 48 to rotate about the pivot point 74, thereby moving the first end 70 away from the suspension cylinder 46. The rotation of the bell crank 48 drives the suspension cylinder 46 to expand. As such, the suspension cylinder 46 may expand as the wheel end 78 of the axle bar 42 moves downwardly along the vertical axis 24 and in the downward direction 66.

The suspension subassembly 40 is configured to substantially maintain seals throughout the range of motion of the axle bar 42 and the slide housing 52. For example, the connecting rod seal 57 may substantially maintain a seal about the connecting rod 56 as the connecting rod 56 moves relative to the axle housing of the suspension subassembly 40. The connecting rod seal 57 may remain coupled to the axle housing while the connecting rod 56 moves. Additionally, the inner shaft seal 59 may substantially maintain the seal at the inner shaft seal plate 58 and the planetary carrier as the planetary carrier rotates. The axle bar cap 85 may substantially maintain the seal within the planetary carrier and axially inward of the axle bar 42 as the axle bar 42 rotates and pivots. Further, the outer shaft seal 62 may substantially maintain the seal at the outer shaft seal plate 60 and about the axle bar 42 as the axle bar 42 rotates and pivots.

The suspension system described herein enables a work vehicle to efficiently traverse uneven terrain. An axle bar and a slide housing of the suspension system may pivot as the work vehicle travels over such terrain. A suspension cylinder coupled to the slide housing may selectively extend and compress as the slide housing pivots. The suspension cylinder may absorb energy associated with the pivoting motion of the axle bar and may provide increased traction at tire(s) of the work vehicle. In this manner, the suspension system may enable the work vehicle to more smoothly travel across the terrain and may enhance a user's experience while operating the work vehicle. For example, the suspension system may increase a comfort level of the user. Additionally, the ability of the suspension system to more efficiently absorb such energy may prevent other portions of the work vehicle from absorbing the forces. As such, a working life of the other portions of the work vehicle may be extended.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A suspension system for a work vehicle, comprising:
an axle bar;
an inner control member;
an outer control member; and
a slide housing, wherein the axle bar extends through the inner control member, the outer control member, and the slide housing, and the axle bar is rotatably coupled to the slide housing and is configured to pivot with the slide housing and relative to the inner control member and the outer control member.

2. The suspension system of claim 1, wherein the inner control member and the outer control member are configured to be rigidly coupled to an axle housing.

3. The suspension system of claim 1, wherein the axle bar is configured to couple to a gear system at a first end of the axle bar and to couple to a wheel at a second end of the axle bar.

4. The suspension system of claim 1, comprising a suspension cylinder coupled to the slide housing.

5. The suspension system of claim 4, wherein the suspension cylinder is configured to absorb energy associated with the pivoting of the slide housing.

6. The suspension system of claim 4, comprising a bell crank and a connecting rod, wherein the bell crank is configured to couple to the suspension cylinder and to the connecting rod, and the connecting rod is configured to couple to the bell crank and to the slide housing.

7. The suspension system of claim 4, wherein the suspension cylinder comprises a hydraulic cylinder, a pneumatic cylinder, or a spring.

8. The suspension system of claim 1, comprising bearings, wherein the axle bar is rotatably coupled to the slide housing via the bearings.

9. The suspension system of claim 1, wherein the slide housing is disposed between the inner control member and the outer control member, and the inner control member and the outer control member are configured to at least partially block lateral movement of the slide housing.

10. A suspension system for a work vehicle, comprising:
an axle bar; and
a suspension subassembly comprising a slide housing and an axle housing, wherein the axle bar is rotatably coupled to the slide housing, and the axle bar and the slide housing are configured to pivot relative to the axle housing; and
a suspension cylinder coupled to the slide housing via a bell crank, wherein the suspension cylinder is configured to absorb energy associated with the pivoting of the slide housing.

11. A suspension system for a work vehicle, comprising:
an axle bar; and
a suspension subassembly comprising a slide housing and an axle housing, wherein the axle bar is rotatably coupled to the slide housing, and the axle bar and the slide housing are configured to pivot relative to the axle housing, wherein the suspension subassembly comprises an inner control member configured to block an inward lateral movement of the slide housing along the axle bar.

12. The suspension system of claim 11, wherein the suspension subassembly comprises an outer control member configured to block an outer lateral movement of the slide housing along the axle bar.

13. The suspension system of claim 12, wherein the slide housing is disposed between the inner control member and the outer control member.

14. The suspension system of claim 11, wherein the inner control member comprises a first surface and a second surface configured to block the pivoting of the slide housing.

15. The suspension system of claim 14, wherein inner control member comprises a third surface generally concentric about a pivoting axis of the axle bar, and wherein inner control member is pivotally coupled to the slide housing via third surface.

16. A suspension system for a work vehicle, comprising:
an axle bar having a first end, a second end, and a pivot point disposed adjacent to the first end; and
a suspension subassembly comprising an inner control member, a slide housing, and an outer control member, wherein the axle bar is rotatably coupled to the slide housing, and the axle bar and the slide housing are configured to pivot about the pivot point of the axle bar relative to the inner control member and the outer control member.

17. The suspension system of claim 16, wherein the axle bar extends through the inner control member, the slide housing, and the outer control member, and the inner control member, the slide housing, and the outer control member are disposed generally between the first end of the axle bar and the second end of the axle bar.

18. The suspension system of claim 16, wherein the first end of the axle bar is configured to couple to a gear system, and the second end of the axle bar is configured to couple to a wheel.

19. The suspension system of claim 16, comprising a suspension cylinder coupled to the slide housing, wherein the suspension cylinder is configured to absorb energy associated with the pivoting of the slide housing.

* * * * *